United States Patent [19]
Allen

[11] 3,723,699
[45] Mar. 27, 1973

[54] INTERCELL CONNECTION MAKING IN ELECTRIC STORAGE BATTERIES

[75] Inventor: Brian Robert Allen, Birmingham, England

[73] Assignee: Joseph Lucas (Industries) Limited, Birmingham, England

[22] Filed: Apr. 30, 1970

[21] Appl. No.: 31,846

Related U.S. Application Data

[63] Continuation of Ser. No. 712,798, March 13, 1968, abandoned.

[30] Foreign Application Priority Data

Apr. 11, 1967  Great Britain.....................16,544/67

[52] U.S. Cl. ......................219/78, 29/628, 136/133, 136/134, 136/135, 136/175, 219/107
[51] Int. Cl. .........................H01r 43/00, H05k 43/00
[58] Field of Search ........29/628; 136/175, 134, 135, 136/133; 219/79, 78, 80, 93, 104, 107

[56] References Cited

UNITED STATES PATENTS

| | | |
|---|---|---|
| 3,275,793 | 9/1966 | Frischkorn et al. ...................136/134 |
| 2,974,284 | 3/1961 | Parker.................................29/626 |
| 3,315,133 | 4/1967 | Walker...........................174/68.5 X |

FOREIGN PATENTS OR APPLICATIONS

| | | |
|---|---|---|
| 1,062,097 | 3/1967 | Great Britain........................136/134 |
| 1,090,075 | 11/1967 | Great Britain........................136/134 |
| 1,000,611 | 8/1965 | Great Britain........................136/134 |

Primary Examiner—Charles W. Lanham
Assistant Examiner—Robert W. Church
Attorney—Holman and Stern

[57] ABSTRACT

In forming an intercell connector in a storage battery, plate groups in adjacent cells are provided with upstanding lugs, one of which has integral therewith a bar extending into a hole in the partition wall. The connection is made by applying pressure to the lugs with electrodes and then passing a current, and the invention consists essentially in shaping the electrode acting on the lug which does not have a bar so that a coining operation is performed and the hole in the cell wall is sealed before electric current is passed.

2 Claims, 5 Drawing Figures

PATENTED MAR 27 1973
3,723,699
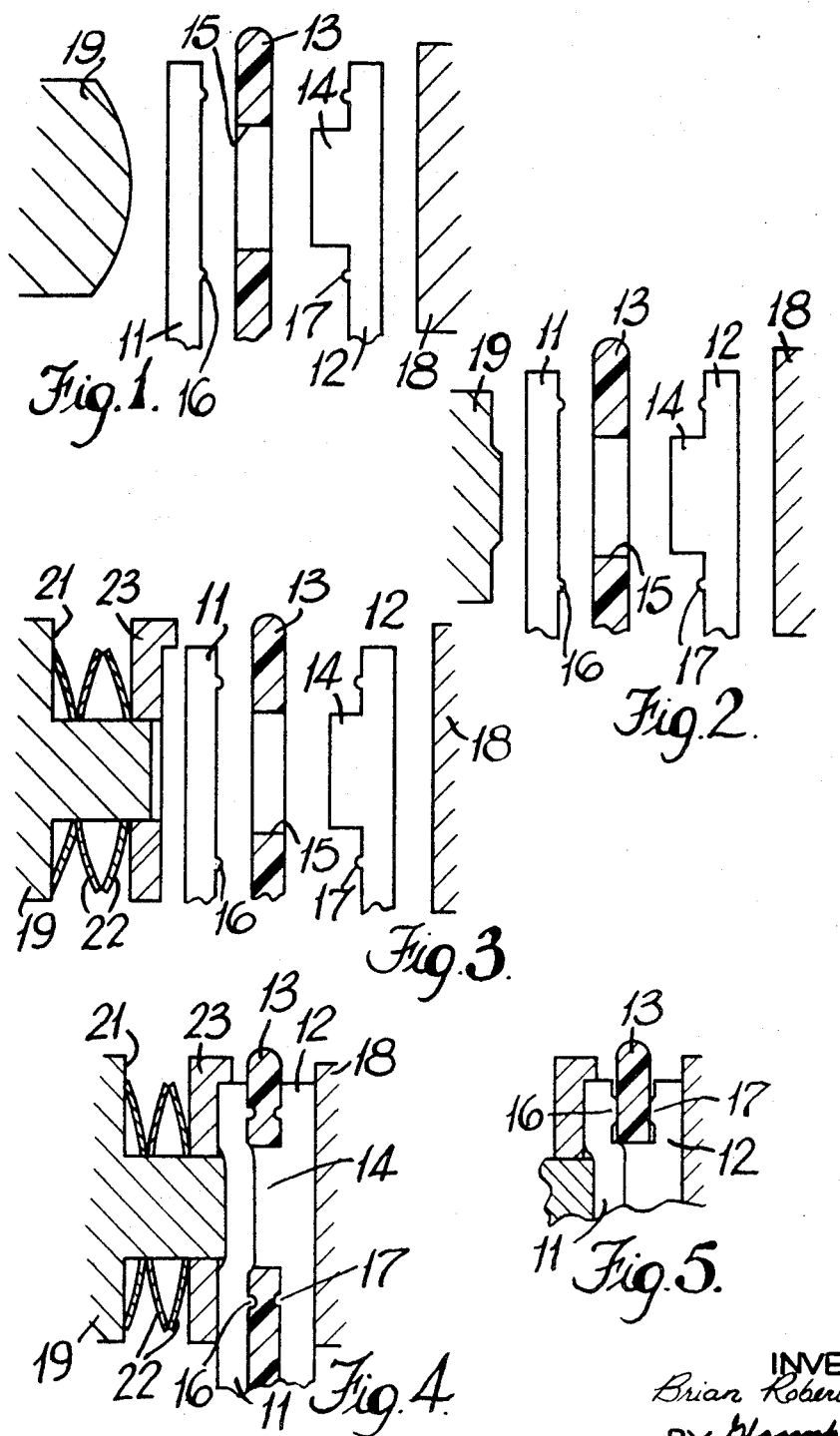
INVENTOR
Brian Robert Allen.
BY Glascock, Downing
& Seebold
ATTORNEYS

INTERCELL CONNECTION MAKING IN ELECTRIC STORAGE BATTERIES

This application is a continuation of Ser. No. 712,798, filed Mar. 13, 1968, now abandoned.

BACKGROUND OF THE INVENTION

It is known to interconnect plate groups in adjacent cells of lead-acid electric storage batteries by providing the straps interconnecting the plates in the groups with upstanding lugs and connecting the lugs by way of a bar extending through a hole formed in the partition wall. The bar can be separate from the lugs, integral with one of the lugs or in two parts integral with the lugs respectively, and the connection is effected by squeezing the lugs and bar and then passing a current between the lugs. The current softens the bar and allows the material from which the bar is formed to flow to seal the hole. It is, of course, of considerable importance to avoid flow of the material between the contacting faces of the lugs and the partition wall, and for this purpose the lugs can be provided with upstanding annular ribs which surround the hole in the partition wall, and are caused to bite into the partition wall, thereby minimizing unwanted flow and also providing a good mechanical key between the lugs and partition wall, thus minimizing the possibility of relative sliding movement between the lugs and partition wall.

Although satisfactory results can be obtained as explained above in a lead-acid battery, the inventor has found considerable difficulty in forming satisfactory connections where the plates and bar are formed from dispersion strengthened lead (i.e., lead containing discrete particles of lead oxide which enhance the strength of the lead). The reason for this is that the conventional lead alloy used in battery manufacture when heated first becomes pasty and then at a higher temperature melts and becomes liquid, and so it is possible to calculate the current so that the lead alloy is caused to flow while in its pasty state. Dispersion strengthened lead, on the other hand, passes rapidly from its solid phase to its liquid phase. If a stationary seal is to be formed, the dispersion strengthened lead must be melted, and it is difficult to ensure that it is confined to the vicinity of the hole in the partition wall, even when the annular ribs mentioned above are employed.

The object of this invention is to provide an improved method of forming an intercell connection. The method is particularly suitable for use with dispersion strengthened lead, but can be used with advantage with other materials, particularly pure lead, and lead alloys.

SUMMARY OF THE INVENTION

The invention resides in a method of forming a connection between plate groups in adjacent cells of an electric storage battery through a hole in the partition wall separating said cells, the method comprising the steps of providing the two plate groups with first and second upstanding lugs respectively extending parallel to the partition wall, the first lug, but not the second lug having integral therewith a bar which extends into said hole, using a pair of electrodes at opposite sides of the partition wall to fuse said bar into engagement with the second lug, the electrode engaging the second lug being shaped to deform said second lug so that the edge of the hole in the partition wall bites into said second lug and ensures that the first and second lugs form with the partition wall a substantially liquid-tight seal, and then passing current between the electrodes while maintaining pressure between the electrodes so as to soften or melt the bar and interconnect the lugs.

BRIEF DESCRIPTION OF THE DRAWINGS

In the accompanying drawings:

FIG. 1 is an exploded view illustrating the relative positions of the various parts used in one example of the invention prior to forming the connection, FIGS. 2 and 3 are views similar to FIG. 1 illustrating two further examples, FIG. 4 shows the positions of the parts in FIG. 3 during the formation of the connection, and FIG. 5 is a view similar to FIG. 4 showing a modification.

DETAILED DESCRIPTION OF THE EMBODIMENTS

In all the examples, plate groups are formed consisting of adjacent positive and negative battery plates spaced by separators the positive plates being interconnected by a conductive strap at one side of the group and the negative plates being interconnected by a conductive strap at the other side of the group. The groups are placed in the cells of a battery case, preferably molded from polypropylene, and the positive plates in one end cell and the negative plates in the other end cell are connected to terminal posts. In the remaining cells, an intercell connection is made between the positive plates in one cell and the negative plates in an adjacent cell in a manner to be described. The lid of the battery can then be welded to the case.

In order to form an intercell connection, the conductive straps associated with the plates to be interconnected are formed with upstanding integral lugs 11, 12 respectively, (FIG. 1) extending at opposite sides of a partition wall 13. The lug 12 is formed with an integral bar 14 which engages in a hole 15 in the wall 13, with the resilience of the partition wall being sufficient to permit the introduction of the plate groups into the cells. The lugs 11, 12 are formed with integral annular ribs 16, 17 respectively which surround the hole 15.

The lug 12 is engaged by a flat electrode 18 having a copper-tungsten tip and an area considerably in excess of the cross-sectional area of the hole 15. The lug 11 is engaged by a copper-chromium electrode having a part-spherical end, with the maximum diameter of the electrode 19 being slightly in excess of the diameter of the rib 16. Pressure is applied between the electrodes 11, 12 to cause the ribs 16, 17 to engage the wall 11. Where lead or lead alloys are employed, the ribs 16, 17 bite into the wall 11, but where dispersion strengthened lead is used, the ribs are deformed and form a sealing ring. At the same time, the electrode 19, by virtue of its part-spherical end, effects a coining operation on the lug 11, forcing it into the hole 15 so that the edge of the hole 15 bites into the lug 11 and the lug 11 engages the bar 14. The bar 14 is a tight fit in the hole 15, and so a substantially liquid-tight seal is formed between the lugs and the partition wall. The bar 14 is then melted by current flowing between the electrodes to form the required connection. Using a 240 volt 50c.s. supply, a welding current of 12,000 amps for 5 cycles with a thrust of 800 lbs has given satisfactory results with dispersion strengthened lead.

FIG. 2 differs from FIG. 1 only in the shape of the electrode 19, which is stepped with a 45° connecting wall. The current is increased to 12,600 amps.

In FIGS. 3 and 4, another form of stepped electrode 19 is used. A shoulder 21 between the two parts of the electrode is engaged by a spring washer 22 acting on the lug 11 through a tufnol pressure pad 23. An initial thrust of 1,000 lbs is used to compress the spring washer 22 and bed the ribs 16,17 in the wall; the thrust is then increased to 1,500 lbs to coin the lug 11 after which, current is passed for 5 cycles at 12,000 amps. FIG. 4 shows the effect of the coining operation where the lugs 11,12 are formed from a conventional lead alloy, and FIG. 5 shows the effect where the lugs are formed from dispersion strengthened lead.

What is claimed is:

1. A method of forming a connection between plate groups in adjacent cells of an electric storage battery through a hole in a partition wall separating said cells, comprising the steps of providing two plate groups with first and second upstanding lugs respectively extending parallel to the partition wall, providing the first lug only with an integral bar which extends into said hole, engaging the lugs with a pair of electrodes at opposite sides of the partition wall, deforming the second lug with one of said electrodes so that the edge of the hole in the partition wall sealingly engages the second lug to form between the first and second lugs and the partition wall a liquid-tight seal, and only then passing current between the electrodes while maintaining pressure between the electrodes so as to soften or melt the bar and interconnect the lugs.

2. The method as claimed in claim 1, comprising the further steps of providing each lug with an annular rib surrounding the hole in the partition wall, and forcing the ribs into contact with the partition wall by the electrodes.

* * * * *